Sept. 23, 1930.  C. L. IPSEN ET AL  1,776,731
WELDING MACHINE
Filed Feb. 19, 1929
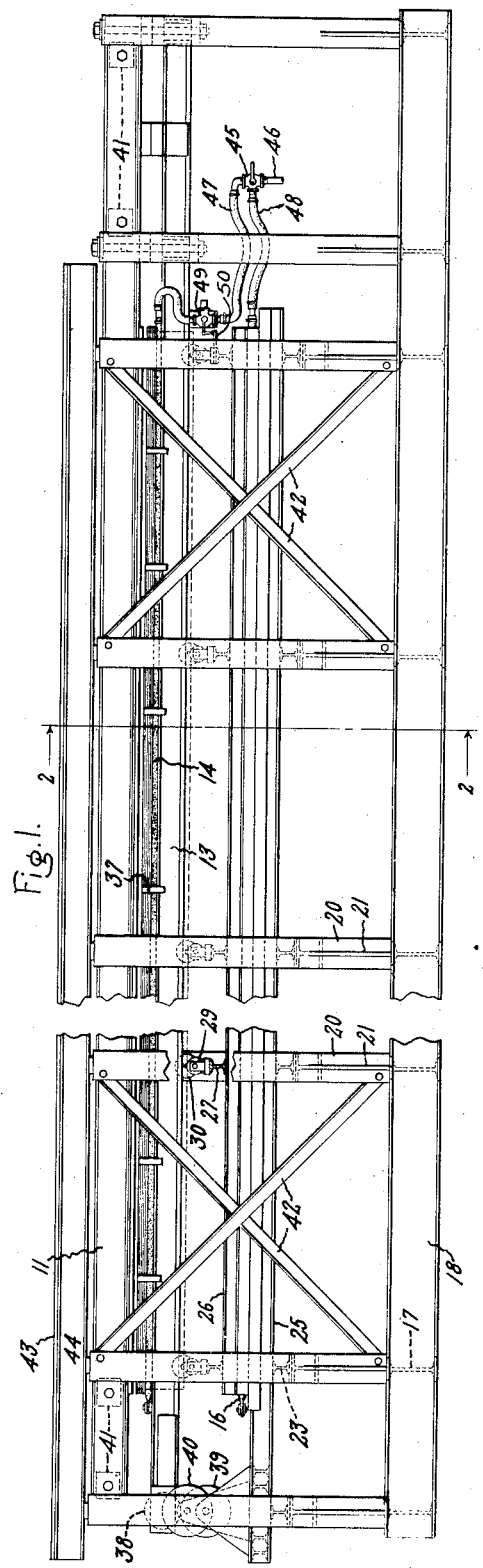
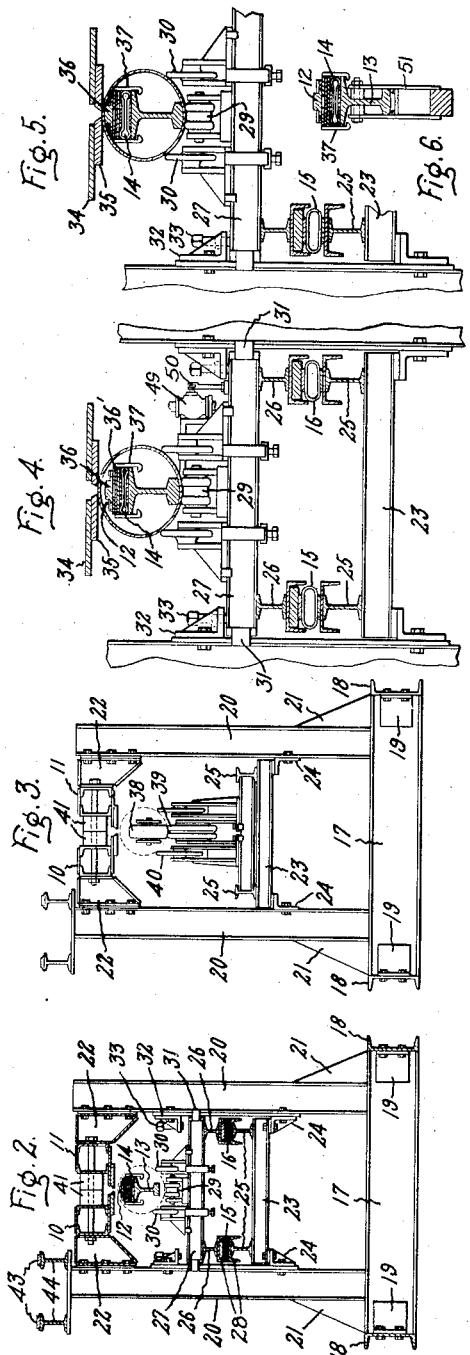
Inventors
Carl L. Ipsen,
Verni J. Chapman,
Pearce Klein,
by Charles E. Mullen
Their Attorney Patented Sept. 23, 1930

1,776,731

UNITED STATES PATENT OFFICE

CARL L. IPSEN, VERNI J. CHAPMAN, AND PEARCE KLEIN, OF SCHENECTADY, NEW YORK, ASSIGNORS TO GENERAL ELECTRIC COMPANY, A CORPORATION OF NEW YORK

WELDING MACHINE

Application filed February 19, 1929. Serial No. 341,148.

Our invention relates to welding machines and more particularly to arc welding machines adapted for welding the longitudinal seams of pipes and tank shells.

In order properly and conveniently to weld the longitudinal seams of pipes and tank shells some arrangement is necessary for firmly holding the edges of the seam to be welded and tightly backing up the seam to prevent molten metal from running through and projecting in irregular beads along the under side of the seam and to prevent the arc from burning through the metal and making a hole in the seam. It is also necessary to back up the seam properly in order to obtain the maximum speed of welding for, to get good penetration, it is necessary to reduce the speed of welding over those portions of the seam that are not properly backed up.

In United States Letters Patent No. 1,640,437 to V. J. Chapman for Electric welding, granted August 30, 1927 and assigned to the same assignee as our present case, apparatus suitable for properly and conveniently backing up a seam to be welded has been described and claimed. The present invention covers an improved arrangement suitable for welding sections of pipe and tank shells having relatively small diameters compared to their lengths, embodying features of the machine of the above referred to patent.

An object of our invention is to provide a machine particularly suited for welding long sections of pipes or tank shells of various diameters in which the edges of the seam are tightly clamped and in which the seam is tightly backed up along its entire length.

A further object of our invention is to provide a machine permitting a rapid insertion and removal of the work and a quick manipulation of the work clamping means.

Our invention will be better understood from the following description when considered in connection with the accompanying drawing and its scope will be pointed out in the appended claims.

In the drawing, Fig. 1 shows a side view of a machine embodying our invention, Fig. 2 shows a section along lines 2—2 of Fig. 1 and Fig. 3 shows a left end view of the machine illustrated in Fig. 1. Figs. 4 and 5 are enlarged views of the central portion of the machine shown in Fig. 2 and serve to illustrate in conjunction with Fig. 2 the operation of the clamping mechanism. Fig. 6 is a detail view showing a shoe attachment for the mandrel of the machine by means of which it is possible to adapt it for welding pipes or tank shells of larger diameter than those illustrated in Figs. 1 to 5.

The machine illustrated in the drawing is a self-contained unit requiring no special foundation except a solid level floor. The frame of the machine supports two holding members 10 and 11 whose lower portions are shaped to engage one side of the work on opposite sides of the seam and a backing member 12 arranged to engage the other side of the work in back of the seam. The backing member is supported on a mandrel 13 about which the work is placed prior to welding. Within the frame of the machine there is a vertically movable framework, to be described in detail below, which in its lower position serves to support the work before it is clamped between the holding members and the backing member for welding and in its upper position elevates the work into engagement with the holding members 10 and 11 and reinforces the mandrel 13 at points intermediate its ends so that the parts may be firmly clamped in position in the machine. The backing member 12 is forced against the work in back of the seam by suitable means such as the distensible fire hose 14 illustrated in the drawing and the vertically movable frame is elevated by similar means. In the particular embodiment of the invention two distensible fire hoses 15 and 16 are used for this purpose.

The base of the machine is a grid structure formed by attaching the ends of a plurality of I beams 17 to the sides of channel beams 18 by means of angles 19. In the particular machine illustrated eight I beams are employed. Upon each of these I beams at points near their ends are mounted two H beams 20 whose attachment thereto is rendered rigid by means of web members 21 extending between them and the I beams 17. The holding members 10 and 11 previously referred to are attached to the upper inside surface of these H beams 20 by brackets 22.

Between the vertical H beams 20 are a plurality of cross beams 23 which are attached to the inside flange of the H beams through the agency of brackets 24. Attached to the upper surface of each of these cross beams are two beams 25 extending along the length of the machine. Above these beams are two other beams 26 also extending along the length of the machine and attached to these latter beams are a second set of cross beams 27 which with the longitudinally extending beams 26 form the vertically movable framework above referred to. Between channel beams 28 extending along and between the members 25 and 26 are the previously referred to distensible hoses 15 and 16 by means of which this movable framework is raised and lowered. On each of the cross beams 27 are a plurality of supporting rollers 29 which are located immediately under the mandrel 13. On each side of the supporting rollers 29 are two guide rolls 30 which help to hold a pipe or tank shell in proper position in the machine and to guide it properly when loading, clamping and unloading. The movable frame made up by the beams or members 26 and 27 is guided in its movement between the H beams 20 by means of guides 31 and the upper limit of travel of the frame is determined by stops 32 provided with adjusting screws 33.

Holding members 10 and 11 are hollow box beams formed by welding together two channel members and two plates one of which, 34, extends beyond one side of the channel members and acts as a support for copper jaw members 35 which engage the work on each side of the seam. The backing member 12 is made up of a copper bar 36 supported on flexible strips of metal 36' which in turn are supported on the distensible fire hose 14 above referred to. At intervals along the length of the strips 36' of the backing member 12 are hooks 37 which through their engagement with the upper flanged portion of the mandrel 13 limit the vertical movement of the backing member relative thereto. By reason of the small diameter of the pipe to be welded relative to its great length the mandrel 13 does not of itself possess sufficient rigidity to withstand the forces exerted upon it during the clamping action. It is for this reason that the movable framework above referred to with its supporting rolls 29 located immediately under the mandrel 13 is resorted to. When the movable frame occupies its upper position and the parts are properly adjusted the supporting rolls 29 engage the work on the outside of the pipe at a point immediately opposite the point where the lower portion of the mandrel 13 engages the inside of the pipe and the support rendered by these rolls 29 is sufficient to give the mandrel that rigidity necessary to resist the clamping process exerted when the hose 14 is distended through the application of some suitable motive fluid such as compressed air. If, however, the mandrel 13 were not thus supported and the clamping force were exerted, unless members such as hooks 37 were provided for transferring this clamping force immediately to the mandrel, the mandrel would be bent out of shape. These hooks also limit the travel of the hose 14 and thus prevent the glued joints in the hose from being pulled open when the mandrel is not properly backed up and the hose is inflated beyond its normal amount.

In the machine illustrated the mandrel 13 is attached at its right hand position to the holding members 10 and 11 and from this point of attachment extends towards the left of the machine parallel to the holding members 10 and 11. By reason of its great length the mandrel is not self-supporting as a cantilever beam and if its left end were not supported in some manner it would sag and take a permanent set. In order to prevent this and yet allow for the insertion and removal of work the left hand end of the beams is supported by means of rollers 38 and 39. Roller 38 is attached to the left hand end of the mandrel 13 and rollers 39 are supported on a framework attached to the inside flanges of the two end H members 20 of the machine. Two guide rolls 40 similar to guide rolls 30 above referred to are provided for guiding pipe sections into and out of the machine. Preferably the end rollers 38 and 39 are each supplied with roller bearings so that the pipe can be easily jammed in between them without damaging them which operation will separate the rolls and raise the outer end of the mandrel 13 an amount equal to the thickness of the wall of the pipe.

The holding members 10 and 11 are held in fixed spaced relationship relative to one another by means of blocks 41 located between the ends of these members and held in place by means of bolts extending therethrough and through members 10 and 11. Further rigidity is added to the framework of the machine by employing cross members 42 near each end of the machine extending between the H members 20 near the ends of the machine.

A track 43 running parallel to the backing member 12 and to the space between the holding members 10 and 11 is supported on the two beams 44 mounted on the upper portions of the H beams 20 on one side of the machine frame. This track is adapted to receive a welding carriage on which is mounted a welding agency such as an automatic arc welding head, examples of which are well known.

Operating fluid is admitted to hoses 14, 15 and 16 from a suitable source of supply, not shown, preferably through the agency of a three-way valve 45 shown in Fig. 1. The motive fluid is supplied to the valve through a pipe 46 and is dispensed by the valve through flexible pipes or conduits 47 and 48 to hoses 14, 15 and 16. Such three-way valves are well known and the internal construction of the valve has consequently not been shown in the drawing. The valve will be connected to the pipes 46, 47 and 48 in such manner that when the valve handle is in one extreme position the source of supply through pipe 46 will be stopped and any operating fluid in the hoses may freely exhaust through pipes 47 and 48 and a port in valve 45 into the atmosphere. The connections will also be such that when the handle of the valve is in an intermediate position the valve will supply operating fluid through flexible connection 48 to hoses 15 and 16 and when the handle is in its other extreme position the valve will also supply motive fluid to hose 14 through flexible connections 47. By reason of this arrangement air pressure will not be applied to the upper hose 14 until after it has been supplied to the two lower hoses 15 and 16 and consequently the movable frame carrying supporting rolls 29 will be raised into proper position to reinforce the mandrel 13 at points intermediate its length before the mandrel is required to sustain the reaction of the hose 14 when it is acting to force the backing member 12 against the work parts. The upper position of the movable frame is determined by the stops 32 and the adjusting screws 33 located therein.

It is however possible when using such a three way valve to operate it so rapidly that air is supplied to hose 14 before hoses 15 and 16 have elevated the movable frame against stops 32. In order to prevent this and definitely predetermine the sequence of operations during clamping means responsive to movement of the frame carrying supporting rolls 29 is provided for preventing inflation of hose 14 until the frame has been moved into proper position against stops 32. In the illustrated machine this means comprises a bypass valve 49 inserted in pipe 47 through which air is conducted to hose 14. This valve is controlled by links 50 attached to the movable frame, the arrangement being such that air supplied through pipe 47 is exhausted or bypassed from hose 14 so long as the movable frame has not been elevated into a position where the supporting rolls 29 carried by it are in a proper position to take the reaction of hose 14 through mandrel 13 and the work. As soon as the frame is in proper position valve 49 is operated by links 50 and air is supplied to hose 14 for the final clamping operation. In place of a bypass valve a stop valve may be used. If a stop valve is used the passageway through pipe 47 will be stopped by the valve until the frame has moved into proper position when the valve will be operated by links 50 to open the passage through pipe 47 to hose 14.

The vertical position of the cross members 23 may be altered by properly adjusting and bolting the angle members 24 along the inside flanges of the H beams 20 in whose flanges a plurality of spaced bolt holes are provided for this purpose. In like manner the position of the stops 32 may be adjusted along the inside flange of the H beams 20. The guide rolls 30 and 40 may be adjusted relatively to supporting rolls 29 and 39 for the reception of pipes of various diameters. By these several adjustments the parts of the machine may be so related relative to one another that different size pipes may be accommodated. When the parts referred to have been adjusted for the accommodation of a pipe larger than that illustrated in the drawing a plurality of detachable shoes 51 shown in Fig. 6 are attached at points along the length of the mandrel 13 corresponding to the position of the supporting rolls 29.

The method of operation is as follows: The valve 45 is manipulated in order to close the supply pipe 46 and to exhaust hoses 14, 15 and 16. The parts of the machine then assume the positions indicated in Fig. 2. A section of pipe is then forced between rollers 38 and 39 into the machine along the rollers 29 and 30 and is adjusted in the machine with the seam immediately above the backing member 12 and between the opening extending along holding members 10 and 11. The valve 45 is then set for the admission of motive fluid to the hoses 15 and 16. These hoses are then distended as shown in Fig. 4 and the movable frame is carried into engagement with the adjusting screws 33 in stop 32 in which position if the adjustment of the parts is correct the work will be advanced against the jaws 35 forming a part of the holding members 10 and 11 and the supporting rollers 29 will be in position to reinforce the mandrel 13 over which the pipe is inserted. The valve 45 is then moved into its next position for the admission of motive fluid to the hose 14 which then assumes the position shown in Fig. 5 forcing the backing member 12 against the inside portion of the pipe immediately back of the seam and firmly clamping the parts at the seam. By reason of the flexible nature of the backing member 12 it is forced into intimate contact with all portions of the seam along its full length and the seam is properly backed up for the welding operation which will then be performed by moving the welding head and the carriage upon which it is supported along the track 43 the length of the seam in order to perform the welding operation. If the valve 45 is moved too rapidly so that air is admitted to hose 14 before hoses 15 and 16 are sufficiently inflated to elevate the movable work against stops 32, valve 49 will exhaust into the atmosphere the air supplied to hose 14 until the movable frame has been moved into its proper position to reinforce the mandrel 13. Only after the frame carrying the supporting rolls 29 is in its proper position can pressure be built up in hose 14 by reason of valve 49 which acts as a safety device as well as an interlock governing the sequence to be followed in clamping the work in place in the machine. After the parts have been welded the valve 45 is moved in a reverse direction to its initial position in which hoses 14, 15 and 16 may exhaust their supply of motive fluid and collapse as shown in Fig. 2 whereupon the finished pipe may be withdrawn from the machine.

In order to facilitate the insertion and removal of pipe or tank shell sections it may prove advantageous to provide means for driving the supporting rolls 29 and 39. Alternatively a chain running over motor driven sheaves or sprockets and having hooks or clamps for taking hold of the pipe or tank shell or an air cylinder located at the side of the pipe or tank shell in such manner that the movement of its piston may be communicated thereto through work engaging connections may be used in place of the driven rolls 29 and 39. Many other arrangements will occur to those skilled in the art. It may also prove desirable to use a set of outside guide rolls similar to rolls 39 and 40 of the machine which may be mounted in a separate support in front of the machine. As such additions are not essential for the correct operation of the machine just described they have not been illustrated in the drawing.

The particular embodiment of the invention illustrated and described has been selected for the purpose of clearly setting forth our invention. It will be apparent, however, that the invention is susceptible of being modified in many ways to meet the different conditions encountered in its use and we, therefore, aim to cover by our appended claims all modifications within the true spirit and scope of our invention.

What we claim as new and desire to secure by Letters Patent of the United States, is:

1. In a welding machine, work clamping means comprising a backing member, a support for said backing member, means reacting against said support for moving the backing member relatively thereto, and means movable from an inoperative into an operative position for reinforcing said support at a point intermediate its length.

2. Welding apparatus comprising holding members arranged to engage one side of the work on opposite sides of the seam to be welded, a backing member arranged to engage the other side of the work in back of the seam, means for moving said backing member into engagement with the work, and means for independently moving the work into engagement with said holding members.

3. Welding apparatus comprising holding members arranged to engage one side of the work on opposite sides of the seam to be welded, a backing member arranged to engage the other side of the work in back of the seam, means for moving said backing member into engagement with the work, means for supporting said backing member and said backing member operating means, and means for moving the work into engagement with said holding members and the supporting means for said backing member.

4. Welding apparatus comprising holding members arranged to engage one side of the work on opposite sides of a seam to be welded, a backing member arranged to engage the other side of the work in back of the seam, a mandrel for supporting said backing member, means reacting against said mandrel for moving said backing member relatively thereto, and means for independently moving the work into engagement with said holding members and for supporting said mandrel through the work at points opposite said backing member.

5. Welding apparatus comprising holding members arranged to engage one side of the work on opposite sides of the seam to be welded, a backing member arranged to engage the other side of the work in back of the seam, means for moving said backing member into engagement with the work, means for supporting said backing member and said backing member operating means, means for moving the work into engagement with said holding members and the supporting means for said backing member, and means for preventing the operation of said backing member until the work has been moved into engagement with said supporting means for said backing member by said last mentioned means.

6. In a welding machine, work clamping means comprising a backing member, a supporting member for said backing member, means reacting against said supporting member for moving the backing member relatively thereto, and means for transferring the clamping force of said backing member to said supporting member after a predetermined relative movement of said members.

7. Electric welding apparatus comprising a flexible backing member adapted to contact with the parts to be welded, means comprising a distensible hose extending along the line of the weld for forcing said backing member against said parts, means for supporting said backing member and said hose and means for transferring the force exerted by said backing member to the supporting means for said backing member after a predetermined movement of said backing member relative to said supporting means.

8. In a welding machine, a backing member, a supporting member for said backing member, means reacting against said supporting member for moving said backing member relative thereto, means movable from an inoperative position into an operative position for reinforcing said supporting member at a point intermediate its ends, and means for moving said reinforcing means into operative position prior to actuating said backing member.

9. Welding apparatus comprising holding members arranged to engage one side of the work on opposite sides of the seam to be welded, a mandrel extending along said member, a backing member supported on said mandrel arranged to engage the other side of the work in back of the seam, means reacting against said mandrel for moving said backing member relative thereto, means for reinforcing said mandrel at points intermediate its ends, means for moving said reinforcing means towards said mandrel, and means for operating said supporting means prior to operating said backing member.

10. Welding apparatus comprising holding members arranged to engage one side of the work on opposite sides of the seam to be welded, a mandrel extending along said members, means for supporting one end of said mandrel separable therefrom for the insertion and removal of work, a backing member arranged to engage the other side of the work in back of the seam supported on said mandrel, means reacting against said mandrel for moving said backing member relative thereto and means for reinforcing said mandrel at points intermediate its ends.

11. Welding apparatus comprising holding members arranged to engage one side of the work on opposite sides of the seam to be welded, a mandrel extending along said members, a flexible backing bar arranged to engage the other side of the work in back of the seam to be welded, a distensible hose extending along said mandrel and between said mandrel and said backing bar, means for supporting said mandrel intermediate its ends, means comprising a distensible hose for moving said supporting means towards said mandrel, and means for transmitting operating fluid to the hose for operating said supporting means prior to transmitting operating fluid to the hose extending along said mandrel.

12. Welding apparatus comprising holding members arranged to engage one side of the pipe on opposite sides of a seam to be welded, a mandrel extending along said members, a flexible backing bar arranged to engage the other side of the pipe in back of the seam to be welded, a distensible hose extending along said mandrel and between said mandrel and said backing bar, means for supporting said mandrel intermediate its ends, means comprising a distensible hose for moving said supporting means towards said mandrel, means for limiting the movement of said supporting means towards said mandrel, and means for transmitting operating fluid to the hose for operating said supporting means prior to transmitting operating fluid to the hose extending along said mandrel.

13. Pipe welding apparatus comprising holding members arranged to engage one side of the pipe on opposite sides of a seam to be welded, a mandrel extending along said members, a flexible backing bar arranged to engage the other side of the pipe in back of the seam to be welded, a distensible hose extending along said mandrel and between said mandrel and said backing bar, means for supporting said mandrel intermediate its ends, means comprising a distensible hose for moving said supporting means towards said mandrel, means for limiting the movement of said supporting means towards said mandrel, means for transmitting operating fluid to the hose for operating said supporting means prior to transmitting operating fluid to the hose extending along said mandrel, and means for exhausting fluid from the hose extending along said mandrel until said supporting means has moved into place against said stops.

In witness whereof, we have hereto set our hands this 18th day of February, 1929.

CARL L. IPSEN.
VERNI J. CHAPMAN.
PEARCE KLEIN.